United States Patent [19]

Nakano

[11] Patent Number: 4,708,391
[45] Date of Patent: Nov. 24, 1987

[54] REAR BODY STRUCTURE FOR MOTOR VEHICLE

[75] Inventor: Mitusou Nakano, Kure, Japan

[73] Assignee: Mazda Motor Corporation, Hiroshima, Japan

[21] Appl. No.: 881,653

[22] Filed: Jul. 3, 1986

[51] Int. Cl.⁴ ............................................. B62D 23/00
[52] U.S. Cl. ...................................... 296/204; 296/30
[58] Field of Search ........................ 296/187, 193–195, 296/198, 203, 204, 29, 30; 280/787, 784, 797, 800

[56] References Cited

U.S. PATENT DOCUMENTS

| | | | |
|---|---|---|---|
| 2,108,215 | 2/1938 | Stief et al. | 296/203 |
| 2,389,907 | 11/1945 | Helmuth | 296/203 |
| 4,563,035 | 1/1986 | Hirakami et al. | 296/195 |

FOREIGN PATENT DOCUMENTS 55-124369 2/1979 Japan.
110776 7/1984 Japan.

Primary Examiner—Dennis H. Pedder
Attorney, Agent, or Firm—Burns, Doane, Swecker & Mathis

[57] ABSTRACT

A rear body structure for a motor vehicle having a rear side frame which extends in a longitudinal direction of a vehicle body on each side at its rear portion and is provided with a thin portion which is so formed as to be thin in thickness in a vertical direction, as compared with other portions that are in front of and at the back of the thin portion, and a protruding portion which protrudes sideways and makes a detour around the thin portion, said thin portion disposed directly between and in contact with a floor panel and the protruding portion, with a spring having a sufficient length for rear suspension being disposed under the thin portion of the rear side frame.

10 Claims, 6 Drawing Figures

REAR BODY STRUCTURE FOR MOTOR VEHICLE

BACKGROUND OF THE INVENTION

The present invention generally relates to a body structure for a motor vehicle and more particularly, to an improvement of a rear body structure for a motor vehicle such as an automobile or the like.

Conventionally, as a rear body structure for an automobile, the Japanese Laid-open Utility Model Publication No. 55-124369 discloses an improved rear side frame wherein the rear side frame which extends in a longitudinal direction of an automobile body on each side of the rear portion thereof is generally formed in a shape similar to that of a figure "Y" at the front side of the rear side frame in order to increase the rigidity thereof.

Meanwhile, in the rear body structure as shown in FIG. 1, a rear suspension 5 is mounted on the rear side frame 1 through a suspension arm 2, a damper 3 and the like for supporting a rear tire 4, and a spring 6 for the rear suspension 5, which is disposed on the lower surface of the rear side frame 1. The rear side frame 1 is required to be formed thin in thickness in a vertical direction at a portion thereof on which the spring 6 is mounted, rather than other portions, for ensuring a sufficient length of the spring 6, thus undesirably resulting in such a drawback as the rear side frame 1 has been decreased in rigidity.

SUMMARY OF THE INVENTION

Accordingly, the present invention has been developed with a view to substantially eliminating the above described drawback inherent in the prior art rear body structure for a motor vehicle, and has for its essential object to provide an improved rear body structure for a motor vehicle in which the rigidity of the rear side frame is increased by reinforcing a thin portion formed thereon on which the spring for rear suspension is mounted.

Another object of the present invention is to provide a rear body structure for a motor vehicle of the above described type which is simple in construction and can be readily manufactured at low cost.

In accomplishing these and other objects, according to one preferred embodiment of the present invention, there is provided a rear body structure for a motor vehicle, having a rear side frame which extends in a longitudinal direction of a vehicle body on each side at the rear portion thereof and is provided with a thin portion which is so formed as to be thin in thickness in a vertical direction, as compared with other portions, and a protruding portion which protrudes sideways and makes a detour around the thin portion, with a spring for rear suspension being disposed under the thin portion of the rear side frame.

According to the present invention, since the protruding portion is arranged on the rear side frame so as to make a detour around the thin portion thereof, the thin portion is reinforced by the protruding portion and the rigidity of the rear side frame is increased.

Furthermore, when the protruding portion is formed on the reinforcing member which is secured on the rear side frame on which the thin portion is formed, the protruding portion can be easily produced, and in addition, since a suspension arm, a damper and the like for the rear suspension can be mounted on the rear side frame through the reinforcing member, the mounting rigidity of the rear suspension can be also increased.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
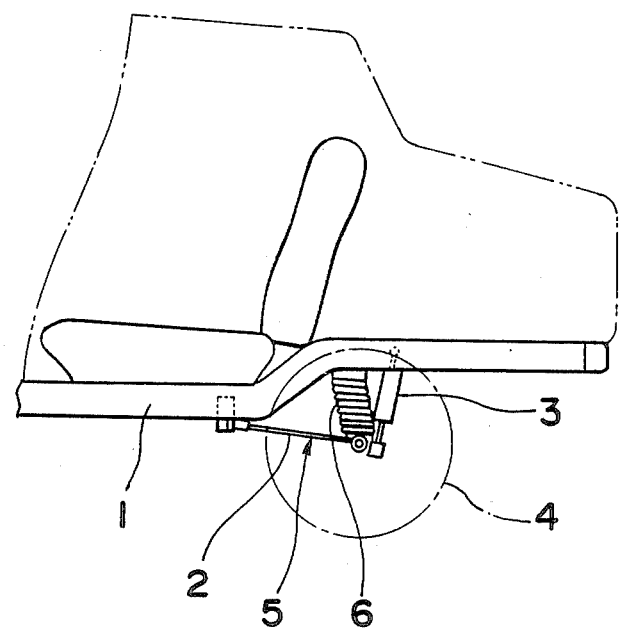
FIG. 1 is a fragmentary side elevational view of a conventional automobile rear body structure (already referred to)

Before the description of the present invention proceeds, it is to be noted that like parts are designated by like reference numerals throughout the accompanying drawings.

Figure 2:
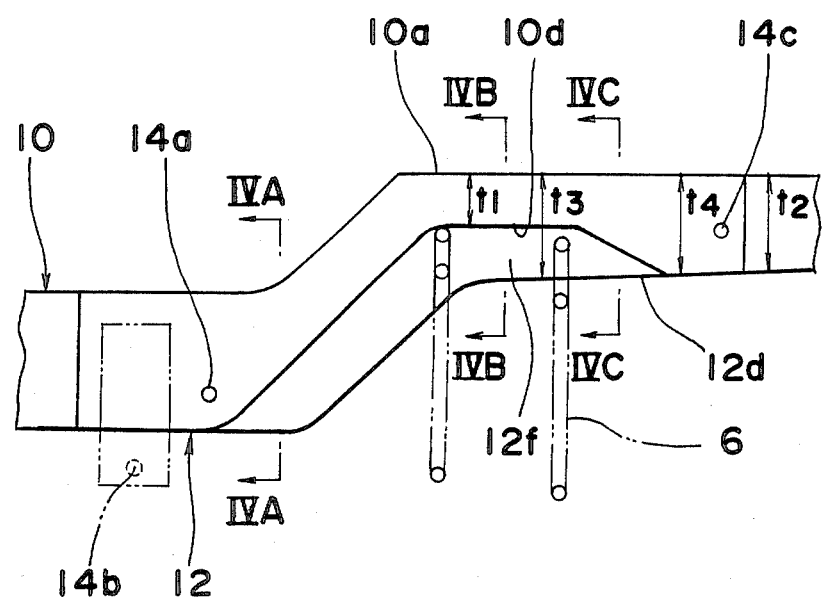
FIG. 2 is a fragmentary side elevational view of a rear side frame of the automobile rear side structure according to one preferred embodiment of the present invention.
Figure 3:
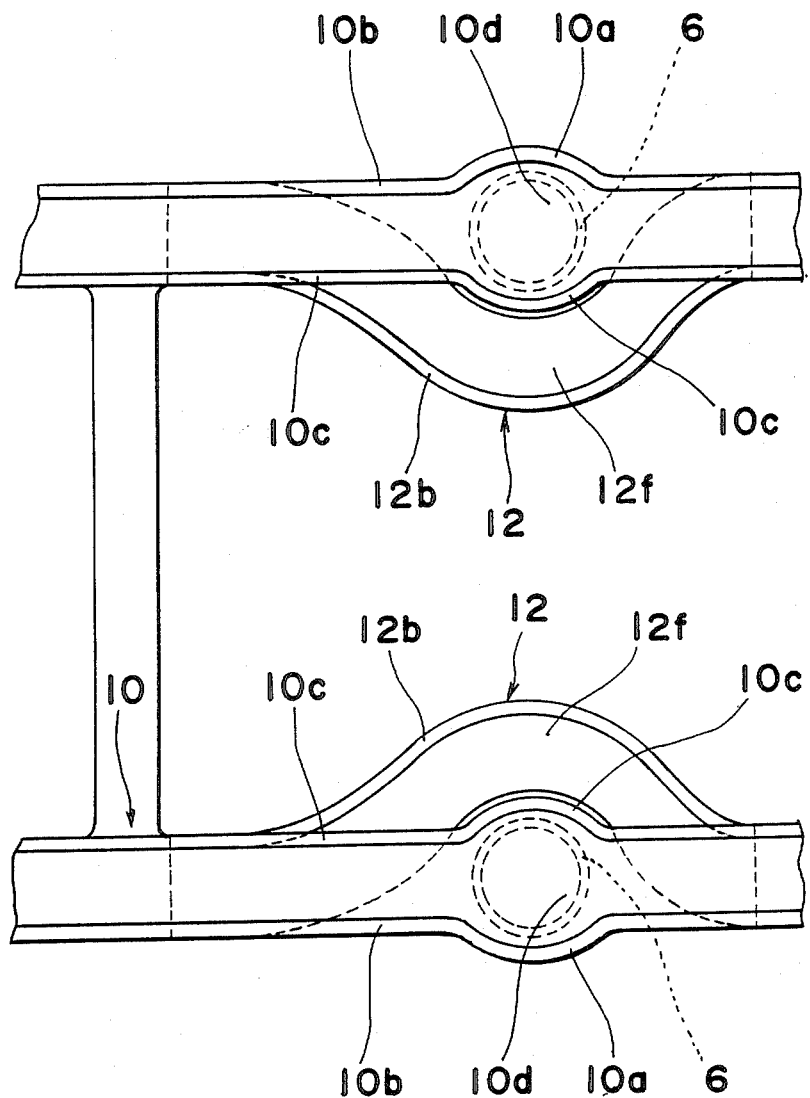
FIG. 3 is a top plan view of FIG. 2.

Referring now to the drawings, there is shown in FIGS. 2 and 3, a rear side frame 10 extending in a longitudinal direction of a vehicle body on each side at rear portion thereof. The rear side frame 10 is provided with a raised portion 10a which is bent upwardly towards the rear end thereof so as to be formed in a shape similar to that of a figure "Z", with a rear suspension for a rear tire being secured to the raised portion 10a of the rear side frame 10.

Figure 4A:
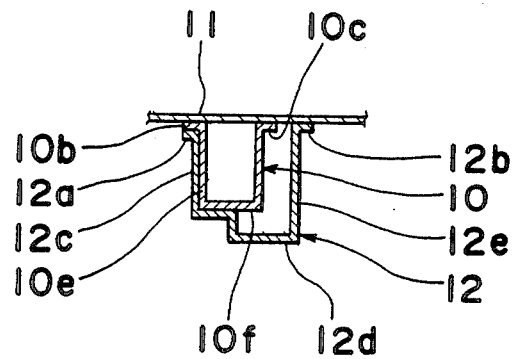
FIGS. 4a, 4b and 4c are fragmentary cross-sectional views taken along the lines IVA—IVA, IVB—IVB and IVC—IVC in FIG. 2, respectively.
Figure 4B:
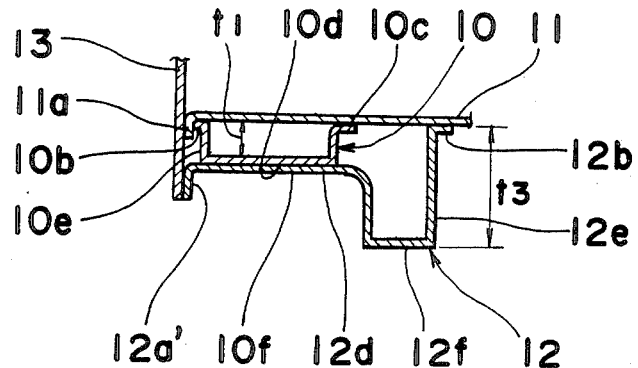
Figure 4C:
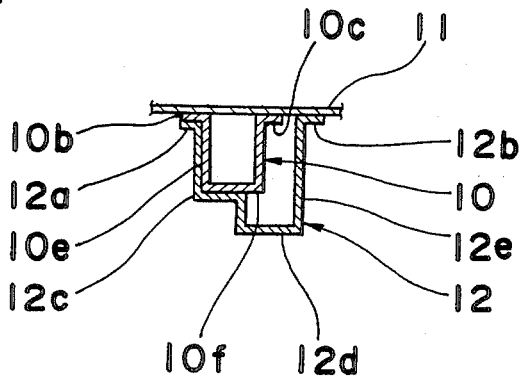

The rear side frame 10 has a cross section generally similar to the shape of a figure "U" as shown in FIG. 4a and is fixedly mounted to the lower surface of a floor panel 11 through outwardly extending flanges 10b and 10c of the rear side frame 10 which are formed on respective sides of the upper portion thereof.

The raised portion 10a of the rear side frame 10 is so formed as to be thinner in thickness in a vertical direction as compared with other portions that are in front of and at the back of the thin portion, that is the former has a thickness of t1, which is approximately half of the thickness t2 of the latter.

In the above described manner, since the thin portion 10d is formed on the raised portion 10a of the rear side frame 10, a spring 6 having a sufficient length can be retained thereunder for the rear suspension.

A reinforcing member 12, which is generally similar in shape to the rear side frame 10 and extends in a longitudinal direction of the vehicle body, is disposed around the thin portion 10d of the rear side frame 10. The reinforcing member 12 includes the rear side frame 10 therein.

The reinforcing member 12 has a cross section generally similar in shape to a figure "U" as shown in FIG. 4a, and is provided with an inside flange 12b which is fixedly connected to the lower surface of the floor panel 11 and an outside flange 12a which is also fixedly connected thereto through the outside flange 10b of the rear side frame 10 in a manner that the outside flange 12a of the reinforcing member 12 overlaps the outside flange 10b of the rear side frame 10. Furthermore, at the front and rear portions of the reinforcing member 12, the reinforcing member 12 is fixedly connected to an outside wall 10e of the rear side frame 10 through an outside wall 12c thereof, and to a bottom wall 10f of the rear side frame 10 through a portion of a bottom wall 12d thereof.

The reinforcing member 12 is connected to the floor panel 11 so as to cover the rear side frame 10 from below.

The reinforcing member 12 is provided with a protruding portion 12f which is curved so as to protrude inwardly at the intermediate portion thereof in a manner that an inside wall 12e thereof makes a detour around the thin portion 10d of the rear side frame 10.

The protruding portion 12f of the reinforcing member 12 is also securely connected to the bottom wall 10f of the rear side frame 10 at a portion of the bottom wall 12d thereof which faces the thin portion 10d of the rear side frame 10, and is so designed that the protruding portion 12f which does not face the thin portion 10d of the rear side frame 10 has a thickness t3 approximately equal to thickness t4 of other portions.

Thus, since the thin portion 10d of the rear side frame 10 is reinforced by the protruding portion 12f of the reinforcing member 12 at its inner circumference, the rigidity of the rear side frame 10 is increased.

An end portion 11a of the floor panel 11 and also the outside flanges 12a' of the reinforcing member 12 are bent downwardly at their portions adjacent to the thin portion 10d of the rear side frame 10 and are secured to the inner surface of a tire housing 13.

In the above described construction, when mounting portions 14a and 14b for the suspension arm or the like are arranged at the front portion of the reinforcing member 12 and a mounting portion 14c for the damper is arranged at the rear portion thereof, each of the parts is consequently mounted on the rear side frame 10 through the reinforcing member 12, with increased mounting strength.

In the above described embodiment, although the reinforcing member 12 is provided with the protruding portion 12f, the rear side frame 10 may be so constructed as to be integrally formed with the protruding portion through machining process thereon.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A rear body structure for a motor vehicle, which comprises:
    a floor panel;
    a rear side frame mounted to said floor panel and extending in a longitudinal direction of a vehicle body on each side at the rear portion thereof;
    said rear side frame including a raised portion;
    said raised portion including a thin portion which is thinner in thickness in a vertical direction that other portions of the rear side frame that are in front of and at the back of the thin portion;
    a protruding portion arranged on said rear side frame which protrudes sideways around said thin portion, said thin portion disposed directly between and in contact with said floor panel and said protruding portion; and
    a spring for rear suspension disposed under said thin portion of said rear side frame.

2. A rear body structure for a motor vehicle as claimed in claim 1, wherein said protruding portion is formed inside of said rear side frame with respect to the vehicle body.

3. A rear body structure for a motor vehicle as claimed in claim 2, wherein said protruding portion is formed on a reinforcing member which is securely connected to said rear side frame.

4. A rear body structure for a motor vehicle as claimed in claim 3, wherein said reinforcing member is so connected to the floor panel as to cover said rear side frame from below.

5. A rear body structure for a motor vehicle as claimed in claim 4, wherein said rear side frame is securely connected to a lower surface of said floor panel through outwardly extending flanges of said rear side frame which are formed on respective ends at an upper portion thereof, and said reinforcing member extends in a longitudinal direction of the vehicle body and is provided with said protruding portion which is curved so as to protrude inwardly at an intermediate portion thereof, with each of said rear side frame and said reinforcing member having a cross section similar in shape to a figure "U".

6. A rear body structure for a motor vehicle as claimed in claim 5, wherein said reinforcing member is securely connected to said floor panel in a manner that an outside flange of said reinforcing member is overlapped on an outside flange of said rear side frame at least at the front and rear portions thereof.

7. A rear body structure for a motor vehicle as claimed in claim 5, wherein an outside wall of said reinforcing member is securely connected to an outside wall of said rear side frame at least at the front and rear portions thereof.

8. A rear body structure for a motor vehicle as claimed in claim 5, wherein a bottom portion of said reinforcing member is securely connected to a bottom portion of said rear side frame.

9. A rear body structure for a motor vehicle as claimed in claim 5, wherein said reinforcing member is securely connected to a tire housing through an outside flange adjacent to said thin portion.

10. A rear body structure for a motor vehicle as claimed in claim 3, wherein said reinforcing member is securely connected to an outside wall and a bottom portion of said rear side frame through an outside wall at least at the front and rear portions thereof and a bottom portion is also securely connected to a tire housing through an outside flange adjacent to said thin portion.

* * * * *